(12) United States Patent
Eble et al.

(10) Patent No.: US 9,662,620 B2
(45) Date of Patent: May 30, 2017

(54) MAGNETIC STIRRER WITH A TEMPERATURE MEASURING DEVICE

(71) Applicant: IKA-WERKE GMBH & CO. KG, Staufen (DE)

(72) Inventors: Erhard Eble, Bad Krozingen (DE); Uwe Brauch, Heitersheim (DE); Thomas Hensle, Breisach (DE); Christian Babel, Feiburg (DE)

(73) Assignee: IKA-WERKE GMBH & CO. KG, Staufen (DE)

( * ) Notice: Subject to any disclaimer, the term of this patent is extended or adjusted under 35 U.S.C. 154(b) by 121 days.

(21) Appl. No.: 14/395,933

(22) PCT Filed: Apr. 26, 2013

(86) PCT No.: PCT/EP2013/001258
§ 371 (c)(1),
(2) Date: Oct. 21, 2014

(87) PCT Pub. No.: WO2013/159936
PCT Pub. Date: Oct. 31, 2013

(65) Prior Publication Data
US 2015/0117136 A1  Apr. 30, 2015

(30) Foreign Application Priority Data

Apr. 27, 2012 (DE) .......... 10 2012 008 612

(51) Int. Cl.
*B01F 13/08* (2006.01)
*B01F 15/06* (2006.01)
(Continued)

(52) U.S. Cl.
CPC ...... *B01F 13/0818* (2013.01); *B01F 15/0035* (2013.01); *B01F 15/00175* (2013.01);
(Continued)

(58) Field of Classification Search
CPC .. B01F 13/08; B01F 13/0818; G01R 33/0005; G01K 1/146
(Continued)

(56) References Cited

U.S. PATENT DOCUMENTS 3,653,262 A    4/1972 Ehrenfried et al.
4,102,194 A *  7/1978 Eng .......... G01K 1/026
                                         340/517
(Continued)

FOREIGN PATENT DOCUMENTS

DE          3342249 A1   5/1985
DE    102006001623 A1   7/2007
(Continued)

*Primary Examiner* — Abbas Rashid
(74) *Attorney, Agent, or Firm* — BudzynFortunato IP Law, LLC

(57) ABSTRACT

A temperature measuring device (1) with a thermometer (2) has a plurality of temperature sensors (3) on one side (10), which function on an electrical basis. The thermometer (2) is immersed in a container or beaker (4) set up in a usage position on a heating plate (102) of a magnetic stirrer (100) and in a medium (5) present therein. The plurality of temperature sensors (3) are arranged spaced apart from one other vertically on the temperature measuring device (1), and are immersed in the medium (5) at different heights in the usage position. It is therefore possible firstly to recognize a temperature stratification inside the medium (5), and secondly, to detect level changes of the medium (5) in the interior of the container (4).

17 Claims, 2 Drawing Sheets

(51) Int. Cl.
  *B01F 15/00*   (2006.01)
  *G01K 1/02*    (2006.01)
  *G01F 23/22*   (2006.01)

(52) U.S. Cl.
  CPC .. *B01F 15/00389* (2013.01); *B01F 15/00396* (2013.01); *B01F 15/065* (2013.01); *G01F 23/22* (2013.01); *G01K 1/026* (2013.01); *B01F 2015/062* (2013.01); *B01F 2215/0037* (2013.01); *G01K 2213/00* (2013.01)

(58) Field of Classification Search
  USPC .................................................. 366/273–274
  See application file for complete search history.

(56) References Cited

U.S. PATENT DOCUMENTS

| | | | | | |
|---|---|---|---|---|---|
| 4,138,408 | A | * | 2/1979 | Mitzlaff | C07D 205/08 540/360 |
| 4,140,593 | A | * | 2/1979 | Mitzlaff | C07D 205/08 205/423 |
| 4,149,941 | A | * | 4/1979 | Mitzlaff | C25B 3/02 205/423 |
| 4,288,300 | A | * | 9/1981 | Mitzlaff | C25B 3/02 205/434 |
| 4,338,363 | A | * | 7/1982 | Gill | B05D 5/00 106/14.05 |
| 5,976,323 | A | * | 11/1999 | Milde | B01D 3/42 203/2 |
| 6,157,009 | A | * | 12/2000 | Fauske | H05B 1/0247 219/497 |
| 7,004,625 | B2 | * | 2/2006 | Egidio | G01K 1/026 374/112 |
| 8,613,849 | B2 | * | 12/2013 | Wong | C25F 3/26 204/232 |
| 8,617,379 | B2 | * | 12/2013 | Wong | C25F 3/16 204/232 |
| 8,678,638 | B2 | * | 3/2014 | Wong | B01F 7/162 366/142 |
| 2002/0168418 | A1 | * | 11/2002 | Lorenz, II | A01K 7/02 424/600 |
| 2003/0219062 | A1 | | 11/2003 | Egidio | |
| 2005/0183582 | A1 | | 8/2005 | McFadden et al. | |
| 2007/0159920 | A1 | * | 7/2007 | Baumfalk | B01F 7/162 366/152.4 |

FOREIGN PATENT DOCUMENTS

| | | |
|---|---|---|
| EP | 1847365 A2 | 3/2007 |
| JP | S55137032 A | 10/1980 |
| JP | S5682422 A | 7/1981 |

\* cited by examiner

MAGNETIC STIRRER WITH A TEMPERATURE MEASURING DEVICE

BACKGROUND OF THE INVENTION

The invention concerns a magnetic stirrer with a stirring drive unit, with a container or beaker, with a heating plate as a support surface for the container or beaker, and with a stirring magnet which can be inserted into the container or beaker and driven by the stirring drive unit, and with a temperature measuring device with a thermometer having a temperature sensor operating on an electrical basis, which is dipped or can be dipped into the medium located in the container or beaker.

Such a magnetic stirrer with a temperature measuring device is already known from DE 33 42 249 C2, where a change in temperature of the medium located in the container or beaker can be measured with the temperature measuring device.

However, very different temperatures and also different fill levels can occur in such a container, which cannot be detected by the temperature measuring device thus far.

Therefore, the problem exists of creating a magnetic stirrer of the kind mentioned at the outset, with which the temperature and the temperature distribution of the medium can be measured more accurately.

SUMMARY OF THE INVENTION

To solve this problem, it is proposed that the temperature measuring device has at least three temperature sensors which can be dipped into the medium being measured in the position of use and which are arranged at different heights and/or with a vertical spacing from each other. In this way, it is possible to detect the temperature of the medium during the heating with only one temperature measuring device at different intervals from the heating plate. Since the heating generally starts from the bottom on account of the heating plate arranged underneath the container or beaker in the usage position and accordingly the temperature within the medium decreases from bottom to top, it is possible to identify a temperature stratification or a temperature distribution within the container especially during the heating of the medium, but also in the further operation, with the help of the temperature measuring device.

Thus, for example, it is possible to control and/or regulate a stirring process, which can help homogenize the temperature within the medium, in dependence on the detected temperature distribution. Likewise, a decrease in the level of medium inside the container or beaker due to evaporation can be identified when the individual temperature sensors as the level of medium falls "emerge" from the medium one after the other and are then no longer surrounded by the medium inside the container, which is generally warmer than the ambient temperature, whereupon the measured temperature value changes, and in particular decreases, with the emergence of the temperature sensor from the medium.

Likewise, a rise in level which may be expected to occur upon boiling or frothing or swelling of the medium can be detected similarly.

In order to prevent a collision of the stirring magnet during operation of the magnetic stirrer inside the container or beaker with the temperature measuring device dipped into the container or beaker in the position of use, it can be advisable for one end of the temperature measuring device that is dipped into the medium in the position of use to have a spacing from the bottom of the container or beaker. This spacing can correspond to at least one height and/or one thickness of the stirring magnet located in the beaker in the position of use, as is already known from DE 33 42 249 C2, or even greater than the thickness or height of the stirring magnet. Thus, even in the case of stirring magnets which have a length corresponding to the diameter of the container or beaker a collision of the stirring magnet rotating in the beaker or container during the operation of the magnetic stirrer with the temperature measuring device located in its position of use can be avoided.

It can be especially advisable for the vertical spacing between the temperature sensors in the position of use to be at least two centimeters each, preferably around one centimeter, optionally around half a centimeter or less, or to have an intermediate value of these. With such dimensioned vertical spacings between the individual temperature sensors, the temperature distribution which establishes itself can be detected with good accuracy and good resolution.

In one advisable embodiment of the invention, the thermometer forming the temperature measuring device can be rod shaped and/or able to be dipped into the medium by one of its two ends. On a rod-shaped thermometer the at least three temperature sensors can be arranged with sufficient vertical spacing from each other. Moreover, it is possible with a correspondingly long rod-shaped thermometer to identify or monitor a temperature distribution and also the level of a medium over a correspondingly large vertical region. Furthermore, the rod-shaped configuration of the thermometer can also be more safe for the user to handle the temperature measuring device, especially in the case of very hot media, since the user can maintain an adequate safety distance from the container with the medium being measured when handling the temperature measuring device.

In order to leave the temperature measuring device dipped in a medium even for a lengthy time, without the user having to hold the temperature measuring device in his hand, it can be advisable for the temperature measuring device to be removably mounted on the edge of the container.

For this purpose, the temperature device can have a mechanical holder for hanging from the edge of the container, especially a hook or a clip element or a suction cup, and/or a tripod mount as the holder, at the second end opposite the end dipped into the medium being measured in the position of use, and/or the end of the temperature measuring device not dipped into the medium in the position of use can itself be fashioned as a hook.

In order to fasten the temperature measuring device to containers and/or beakers of different height, it can be advisable for the temperature measuring device to be height-adjustable in relation to its holder. In this way, the temperature measuring device for example in the event of an especially shallow container or beaker can be lowered so much relative to the holder on the edge that the temperature sensors of the temperature measuring device can reach the medium being measured and reach the intended position for the measurement.

It can be advantageous for at least one of the temperature sensors or all temperature sensors to be arranged on one side of the temperature measuring device which faces the center of the container in the position of use. In this way, it is possible for the temperature sensors to measure the temperature prevailing inside the volume of the container and not a temperature which is too low on account of proximity to the edge of the container or a side wall of the container. This can be of importance when a maximum temperature value should not be exceeded when heating a medium.

When the temperature sensors of the temperature measuring device are configured as resistance thermometers it is then possible to identify the change in level or identify a change in level within the container even when the temperature of the medium is identical to the temperature of the ambient air outside the medium.

Since the thermometer is configured as a resistance thermometer, the measurement current required for the measurement can result in its own heating of the individual sensors. In the case of a temperature sensor surrounded only by air, this heating can be different from a temperature sensor located in a liquid medium. Since the ambient air and the normally more dense medium have different thermal diffusivities and heat capacities, an additional thermal input to the temperature sensors due to its own heating can be given off by them at different rates. The temperature sensor surrounded by air can be thermally "insulated" against a cooldown in a manner which is different from the temperature sensor surrounded by the medium.

Thus, the temperature sensor surrounded by air, which in most cases has a lower thermal conductance than the denser medium, can become heated differently under the influence of the measurement current. This effect can be measured by the temperature sensor and used to determine which of the temperature sensors is no longer surrounded by the medium on account of a decreasing level of medium, and is already above the level of the medium and thus in the air.

A dropping of the level of medium inside the container or beaker—for example, due to evaporation or a boiling of the medium—can be easily recognized by means of the temperature measuring device if at least one temperature sensor in the position of use of the temperature measuring device is situated outside the medium being measured or outside the container. Thus, the temperature sensor situated outside the container or outside the medium can measure the temperature of the surroundings and provide this temperature measurement value as a reference and/or comparison measurement value for the temperatures detected by the other temperature sensors. In particular in the case of media heated above the ambient temperature it is then possible to determine a lowering of the level of the medium by a comparison of the measurement values of the temperature sensors.

If at least one of the temperature sensors is connected to a control and/or regulating mechanism for the heating plate and/or for a stirring drive unit, especially a stirring drive unit of a magnetic stirrer, the heating process of the medium can be controlled in dependence on the measured temperature distribution and/or the evaporation or vaporization of the medium. For example, in event of a recognized inhomogeneous temperature distribution in the medium, it is possible to increase the speed of the stirring drive unit so that this can contribute to a more uniform and faster distribution of the differently heated medium and thus to a homogenization of the temperature distribution in the overall container or beaker. Furthermore, it is possible to deactivate the heating plate, for example, as soon as the medium has reached a previously defined level due to evaporation or vaporization thanks to the heat input from the heating plate, which can be detected with the help of the temperature sensors in the previously defined manner. If the heating plate is switched off in good time, or the heating power is reduced, one can prevent the level from dropping below this previously defined minimum value due to further heat input into the medium. This can also be important from a safety standpoint, since the heating plate can be shut off in good time before the entire medium has evaporated from the inside of the container or beaker.

In similar manner, it is also possible to prevent an excessive boiling or frothing of the medium. Thus, the heating plate can be switched off as soon as a certain increase in level inside the container is detected by the temperature sensors.

It can be possible to connect all temperature sensors of the temperature measuring device to the control and/or regulating mechanism and to select at least one of the temperature sensors for the control and/or regulating of the heating plate or the stirring drive unit. Thus, temperature changes at one or more defined temperature sensors can serve as control or regulating variables for the control and/or regulating mechanism.

It can be especially advisable to connect the temperature measuring device to the control and/or regulating mechanism via a wire and/or via a cable and/or wirelessly, especially via antennas situated at the temperature measuring device and at the control and/or regulating mechanism, and/or to organize a data exchange between them.

Moreover, it is possible to connect the temperature measuring device to a display device for the displaying of the detected measurement values via a wire and/or via a cable and/or wirelessly, especially via an antenna, from which display device a user can read off the current temperature or the current temperatures of each temperature sensor.

In order to monitor other physical quantities besides the temperature of the medium, it can be advisable for the temperature measuring device to have, besides the temperature sensors, at least one additional sensor for another physical quantity, especially a Hall probe and/or a Hall sensor and/or a pH sensor. When using a Hall sensor it is possible to monitor and also optionally control or regulate the speed of the stirring drive unit of the magnetic stirrer, i.e., the speed of a rotational magnetic field or the speed of a rotating magnet of the stirring drive unit. Advisedly, this Hall sensor is arranged at the end of the temperature measuring device facing the stirring drive unit in the position of use.

BRIEF DESCRIPTION OF THE DRAWINGS

A sample embodiment of the invention shall be explained below with the help of the drawing. There are shown, in the partly schematic representation.

DETAILED DESCRIPTION OF THE INVENTION

Figure 1:
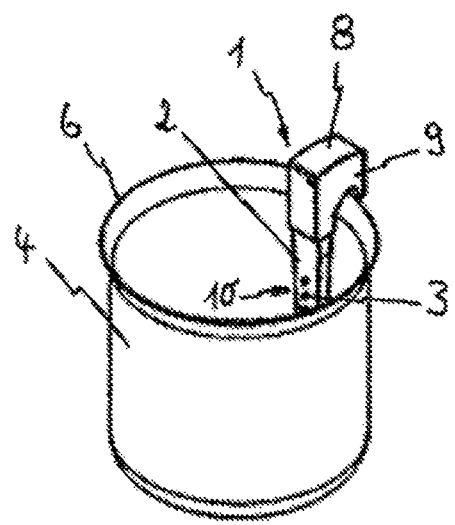
FIG. 1, a perspective representation of a beaker with a temperature measuring device according to the invention with several temperature sensors, hung from one edge of the beaker, FIG. 2, a longitudinal section through the beaker filled with liquid as shown in FIG. 1 and a front view of the temperature measuring device, the temperature measuring device having seven temperature sensor dipped into the medium and one additional sensor for another physical quantity, arranged at its lower end, FIG. 3, a perspective representation of another beaker with a temperature measuring device according to the invention hung on one edge of the beaker, there being noticeable a stirring magnet inside the beaker, and FIG. 4, a sectional side view of a magnetic stirrer according to the invention with the beaker shown in FIG. 3, placed on a heating plate of the magnetic stirrer.

A temperature measuring device designated overall as 1 has, according to the figures, a thermometer 2 with several temperature sensors 3 on an electrical basis. FIG. 1 shows the temperature measuring device 1 in its position of use in a container or beaker 4. According to FIG. 2 and FIG. 4 the beaker 4 contains a liquid medium 5, in which medium 5 the temperature sensors 3 of the temperature measuring device 1 are dipped.

Figure 4:
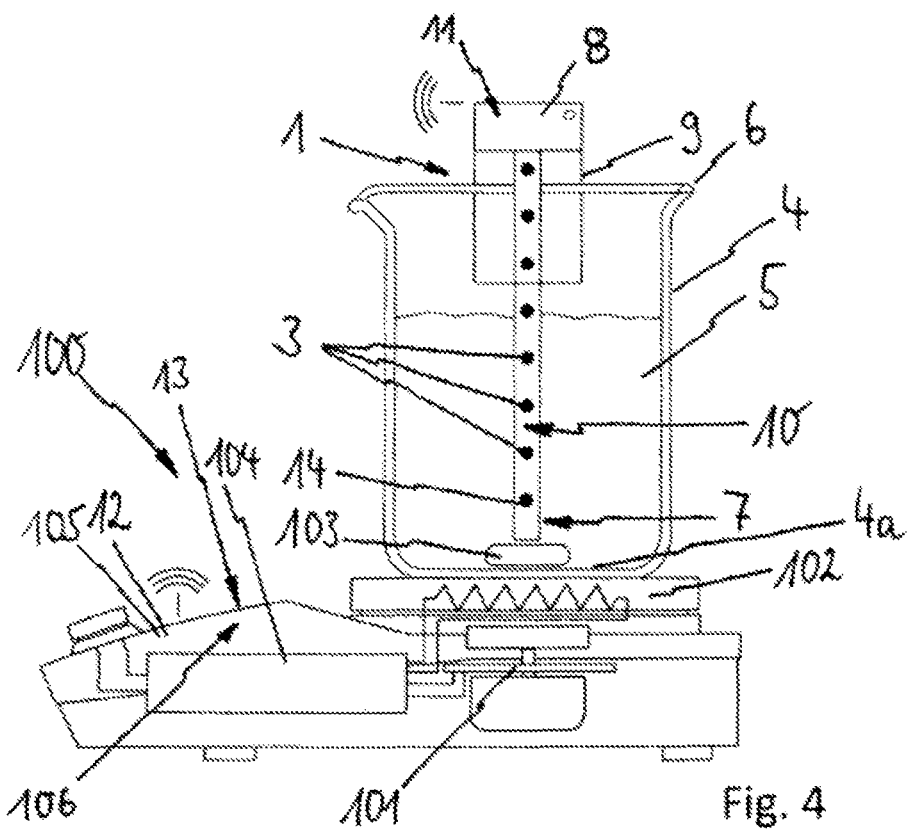

In order to heat the medium 5 inside the container 4, the container 4 can be placed on a heating plate 102 of a magnetic stirrer 100, represented in FIG. 4. For the stirring of the medium 5, the magnetic stirrer 100 will drive the one stirring magnet 103 situated in the container 4 in the position of use via a rotary magnetic field generated by a stirring drive unit 101 of the magnetic stirrer 100.

The temperature sensors 3 are arranged at different heights and with vertical spacing from each other on the temperature measuring device 1. The vertical spacing of the temperature sensors 3 between each other is around one half to one centimeter each time. But it is also possible to make the vertical spacings between the temperature sensors larger or smaller. The temperature measuring devices 1 shown in FIGS. 1 to 4 have a total of seven and eight temperature sensors 3 arranged one above another. In particular, for larger and/or shallower beakers or containers it is also conceivable to arrange a larger number of temperature sensors 3 on the temperature measuring device 1, preferably around ten or more temperature sensors 3.

It is likewise possible to adapt the depicted rod-shaped thermometer 2 of the temperature measuring device 1 to different beakers in regard to its length. The longer the rod-shaped thermometer 2 of the temperature measuring device 1, the more temperature sensors 3 can be arranged on the thermometer 2.

Figure 3:
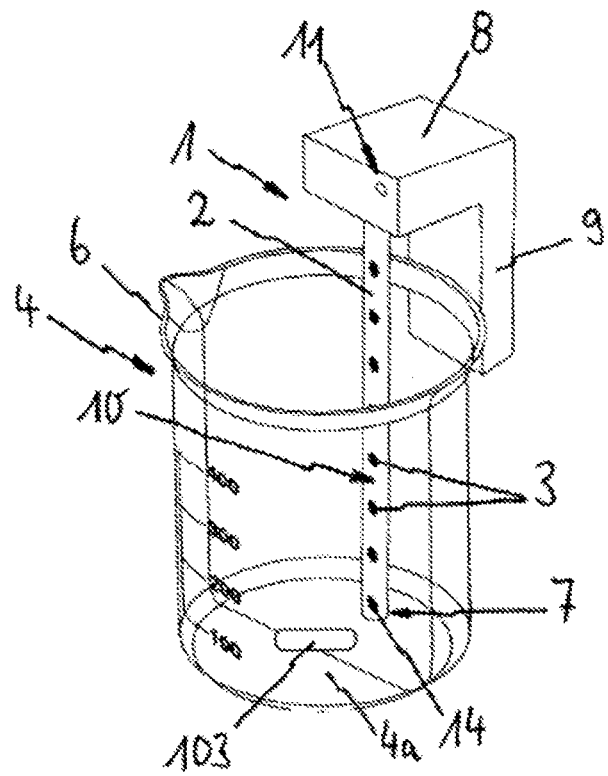

In particular, FIGS. 1, 3 and 4 show that the temperature measuring device 1 is arranged on one edge 6 of the container 4. For this purpose, the temperature measuring device 1 has a mechanical holder 9 for hanging from the edge 6 of the container 4 at a second end 8 opposite the end 7 dipped into the medium 5 being measured in the position of use, so that the temperature measuring device 1 is fastened removably on the edge 6 of the container 4.

In the sample embodiments of the invention shown in the figures, this holder 9 consists in the temperature measuring device 1 itself being hook-shaped in the region of its second end 8 so that it can be hung from the edge 6 of the container 4.

In embodiments of the invention not depicted, this holder 9 can be fashioned as a hook or as a clip or also as a suction cup or some other fastening element. Likewise, the temperature measuring device 1 can have a tripod mount, by which the temperature measuring device 1 can be secured to customary tripods.

In particular, in the embodiment of the temperature measuring device 1 with a tripod mount, it is then possible to adjust the height of the temperature measuring device 1 relative to its holder 9 and relative to the container 4 in which it is supposed to be dipped. Thus, the position of the temperature measuring device 1 inside the beaker or container 4 can be adapted to the level of the medium 5.

Also in the case of particularly shallow beakers or containers 4 it is possible to move the temperature measuring device 1 enough relative to its holder 9 that the temperature sensors 3 of the temperature measuring device 1 dip into the medium 5.

Figure 2:
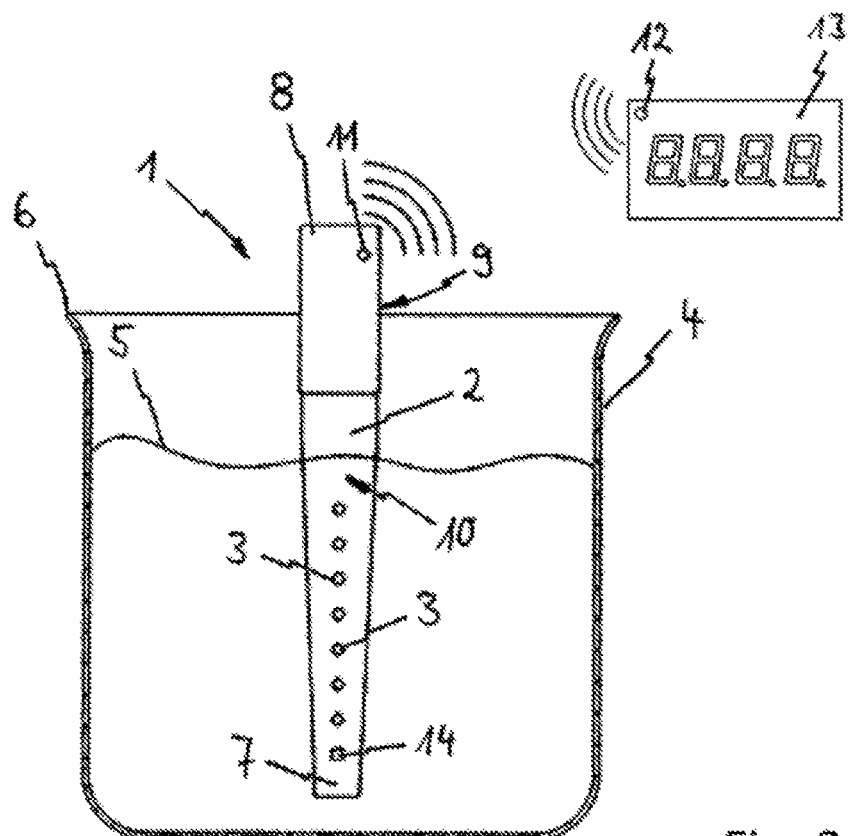

As shown by FIGS. 2 to 4, the end 7 of the temperature measuring device 1 that is dipped into the medium 5 has a spacing from a bottom 4a of the container or beaker 4. This spacing is larger than one thickness and/or one height of the stirring magnet 103.

According to the figures, all the temperature sensors 3 are arranged on one side 10 of the temperature measuring device 1 and point in their position of use toward the center of the container 4. Thus, the temperature sensors can measure the temperature of the medium 5 in a region where the medium 5 is the warmest thanks to the heating by the heating plate 102 of the magnetic stirrer 100, shown in FIG. 4, on which the beaker or container 4 is placed.

The vertically spaced arrangement of the temperature sensors 3 on the rod-shaped thermometer 2 of the temperature measuring device 1 makes it possible to identify a temperature stratification arising in the medium 5 by the heating of the medium 5, which occurs from the bottom with the aid of the heating plate 102.

This temperature stratification constitutes an inhomogeneous temperature distribution in the medium 5, which is not desirable in many applications. In order to break up the temperature stratification and homogenize the temperature in the entire medium 5, the medium 5 is warmed over a lengthy time or, in order to shorten this time, it is mixed with the help of the magnetic stirrer 100.

With the help of the temperature measuring device 1 it is possible to monitor the heating process as well as the mixing process and heat or stir the medium 5 just enough for the medium 5 to have a homogeneous temperature in its entire volume.

The temperature sensors 3 of the temperature measuring device 1 are designed as resistance thermometers. In order to measure the temperature, measurement currents are used in the temperature sensors 3 designed as resistance thermometers, which actually lead to an unintentional transient heating of the temperature sensors.

This actually detrimental quality of the resistance thermometer can be utilized for another function of the temperature measuring device 1 according to the invention. Thus, it is possible to measure with the temperature sensors 3 not only the temperature but also the fill level of the beaker of container 4. This is primarily of interest when the beaker or container 4 is placed on the heating plate 102 of the magnetic stirrer 100 in order to warm the medium 5 located in the beaker or container 4 for a lengthy time or to boil off or reduce the medium 5.

Due to the vaporization of the medium 5 from the beaker or container 4, the fill level of the beaker or container 4 decreases over time. With this, the level of the medium 5 drops. Gradually the temperature sensors 3 of the temperature measuring device 1 emerge from the medium 5—due to their vertical spacing at the side 10 of the thermometer 2 of the temperature measuring device 1.

In the case of a medium 5 which is warmer or even colder than the ambient temperature, i.e., especially warmer or colder than the ambient air in which the beaker or container 4 is placed, the lowering of the fill level inside the beaker or container 4 means that the temperature sensors 3 are no longer surrounded by the warmer or colder medium 5. Thus, with the change in level of the container 4, a temperature change gradually occurs at the individual temperature sensors, from which the changing fill level can be deduced.

In particular, in the case of media which have a tendency to vaporize at room temperature, a change in fill level in the beaker or container 4 can likewise be identified with the help of the temperature measuring device 1. The different thermal conductivities of the ambient air and the medium 5 play a role here.

As already described above, the measurement current based on the mode of operation of a resistance thermometer results in a heating of the individual temperature sensors 3. Due to the different thermal conductivities of the medium 5 and the ambient air, a different cooldown behavior of the temperature sensor 3 is observed when it goes into or comes out of the medium 5 during a temperature measurement.

If the thermal conductivity of the air is less than the thermal conductivity of the medium 5, a slower cooldown of the temperature sensor 3 heated by the measurement current will be observed as it emerges from the medium 5.

If the thermal diffusivities of the ambient air and the medium 5 are reversed, one will observe that the warming of the temperature sensor 3 disappears more slowly as the temperature sensor 3 emerges from the medium. Thus, the fill level of the container 4 can be deduced from the cooldown behavior of the temperature sensors 3. Besides a lowering of the level, of course, a rising of the level of the medium 5 can also be recognized, for example, which can arise due to a boiling, frothing, or swelling of the medium 5.

In one embodiment of the invention not depicted it is also possible to arrange at least one temperature sensor 3 in the position of use of the temperature measuring device outside the medium 5 being measured or outside the container 4. This temperature sensor 3 arranged outside the medium 5 or outside the container 4 furnishes a temperature reference value, with which the temperature measurement values ascertained with the temperature sensors 3 arranged inside the beaker or container 4 can be compared. Once again, a change in level of the medium 5 inside the container 4 can be deduced from the comparison.

The temperature sensors 3 are connected to a control and/or regulating mechanism 104 for the heating plate 102 and/or for the stirring drive unit 101 of the magnetic stirrer 100. The connection can be realized wirelessly, especially by radio, via an antenna 11 arranged at the second end 8 of the temperature measuring device 1, the one which is not dipped, and/or an antenna arranged on the magnetic stirrer 100 or a receiving antenna 105.

Thus, it is possible to control or regulate both the heating and the stirring process in dependence on the temperatures of the medium 5 as determined with the help of the temperature sensors 3 of the temperature measuring device 1, that is, to monitor the speed of the stirring drive unit 101 of the magnetic stirrer 100 and also optionally control or regulate it, especially in dependence on a measurable temperature stratification or in dependence on a measurable temperature course in the medium 5 being heated.

But it is also conceivable for the temperature measuring device 1 to be connected to the control and/or regulating mechanism 104 via a wire or a cable. According to FIG. 2, the temperature measuring device 1 sends via the antenna 11 the temperatures of the medium 5 measured by the temperature sensors 3 to a display device 13 likewise having an antenna 12, which in the sample embodiment of FIG. 4 is configured as a display 106 on the magnetic stirrer 100. In a sample embodiment of the invention not depicted, the temperature measuring device 1 is connected by a wire or a cable to the display device 13.

The display device 13 or the magnetic stirrer 100 with the display 106 and the temperature measuring device 1 are set up to exchange data with each other. Furthermore, it is possible for the temperature measuring device 1, the display device 13, as well as the control and/or regulating mechanism 104 to be in contact with each other via wire, via cable, or wirelessly via radio, especially via the antennas 11 and 12 or the receiving antenna 105 of the magnetic stirrer 100 and also optionally an additional antenna on the control and/or regulating mechanism 104.

Moreover, at the end 7 dipped into the medium 5 one can see in FIG. 2 an additional sensor 14 for another physical quantity. This sensor 14 in the sample embodiment is a Hall probe or a Hall sensor, with which the speed of the stirring drive unit 101 can be measured, which stirring drive unit 101 actuates the stirring magnet 103 by its rotary magnetic field.

In other embodiments of the invention, this sensor 14 can also be, for example, a pH value sensor or some other sensor.

The temperature measuring device 1 with the thermometer 2 has several temperatures sensors 3 on one side 10, which operate on an electrical basis. The thermometer 2 is dipped into the container or beaker 4 placed on the heating plate 102 of the magnetic stirrer 100 in the position of use and in the medium 5 located therein. The several temperature sensors 3 are vertically spaced apart on the temperature measuring device 1 and dipped into the medium 5 at different heights in the position of use. Thus, it is possible, on the one hand, to identify a temperature stratification within the medium 5 and, on the other hand, detect a change in level of the medium 5 inside the container 4.

The invention claimed is:

1. A magnetic stirrer (100) comprising: a stirring drive unit (101) for stirring a medium located in a container or beaker (4); a heating plate (102) as a support surface for the container or beaker (4); a stirring magnet (103) which is insertable into the container or beaker (4) and drivable by the stirring drive unit (101); and a temperature measuring device (1) with at least three temperature sensors (3) arranged at different heights with a vertical spacing from each other such that at least one of the temperature sensors (3) is located outside the container or beaker (4) during use, wherein the temperature measuring device (1) having opposing first and second ends (7, 8), the first end (7) for being dipped into the medium (5) during use, the second end (8) including a hook-shaped mechanical holder (9) configured for removable mounting to an edge (6) of the container or beaker (4).

2. The magnetic stirrer (100) according to claim 1, wherein, the first end (7) of the temperature measuring device (1), during use, is spaced from a bottom (4a) of the container or beaker (4).

3. The magnetic stirrer (100) according to claim 1, wherein the vertical spacing between the temperature sensors (3) is at least two centimeters.

4. The magnetic stirrer (100) according to claim 1, wherein, the temperature measuring device (1) is at least partially rod shaped.

5. The magnetic stirrer (100) according to claim 1, wherein, the temperature measuring device (1) is height-adjustable in relation to the hook-shaped mechanical holder (9).

6. The magnetic stirrer (100) according to claim 1, wherein, at least one of the temperature sensors (3) is arranged to face a center of the container or beaker (4) during use.

7. The magnetic stirrer (100) according to claim 1, wherein, the temperature sensors (3) of the temperature measuring device (1) are configured as resistance thermometers.

8. The magnetic stirrer (100) according to claim 1, wherein, at least one of the temperature sensors (3) is connected to a control and/or regulating mechanism (104) for the heating plate (102) and/or for the stirring drive unit (101).

9. The magnetic stirrer (100) according to claim 8, wherein, all of the temperature sensors (3) of the temperature measuring device (1) are connected to the control and/or regulating mechanism and at least one of the temperature sensors (3) can be selected for control and/or regulating of the heating plate (102) or the stirring drive unit (101).

10. The magnetic stirrer (100) according to claim 8, wherein, at least one of the temperature sensors (3) is connected to the control and/or regulating mechanism (104) via one or more of: a wire, a cable and wirelessly.

11. The magnetic stirrer according to claim 1, wherein, the temperature measuring device (1) is connected to a display device (13, 106) for displaying of measurement values collected by at least one of the temperature sensors, the temperature measuring device (1) is connected to the display device (13,106) via one or more of: a wire, a cable and wirelessly.

12. The magnetic stirrer (100) according to claim 1, wherein, the temperature measuring device (1) has, besides the temperature sensors (3), at least one additional sensor (14) for sensing a physical quantity other than temperature.

13. The magnetic stirrer (100) according to claim 12, wherein, the at least one additional sensor (14) is a Hall probe and/or a Hall sensor.

14. The magnetic stirrer (100) according to claim 1, wherein, the vertical spacing between the temperature sensors (3) is around one centimeter.

15. The magnetic stirrer (100) according to claim 1, wherein, the vertical spacing between the temperature sensors (3) is around half a centimeter or less.

16. The magnetic stirrer (100) according to claim 10, wherein, at least one of the temperature sensors (3) is wirelessly connected to the control and/or regulatory mechanism (104) via antennas (105) situated at the temperature measuring device (1) and at the control and/or regulatory mechanism (104).

17. The magnetic stirrer (100) according to claim 11, wherein, the temperature measuring device (1) is wirelessly connected to the display device (13, 106) via an antenna (12).

* * * * *